United States Patent [19]
Kitazaki et al.

[11] Patent Number: 6,104,578
[45] Date of Patent: Aug. 15, 2000

[54] MAGNETIC DISK AND MAGNETIC DISK APPARATUS HAVING AN ANNULAR START-STOP AREA WITH A RADIAL DOWNSLOPE

[75] Inventors: Nobuyuki Kitazaki; Yoshiaki Sonobe; Masayuki Kanamaru, all of Fujisawa, Japan

[73] Assignee: International Business Machines Corporation, Armonk, N.Y.

[21] Appl. No.: 08/406,768

[22] Filed: Mar. 17, 1995

Related U.S. Application Data

[63] Continuation of application No. 08/084,674, Jun. 29, 1993, abandoned.

[51] Int. Cl.$^7$ .................................................. G11B 5/82
[52] U.S. Cl. ............................................................. 360/135
[58] Field of Search ...................................... 360/135, 105; 369/280

[56] References Cited

U.S. PATENT DOCUMENTS 5,012,371  4/1991  Pollard et al. ............................ 360/105
5,233,597  8/1993  Nakayama et al. ...................... 369/280

FOREIGN PATENT DOCUMENTS

| 56-68902 | 6/1981 | Japan | 369/280 |
| 57-64331 | 4/1982 | Japan | 369/280 |
| 62-6438 | 1/1987 | Japan | 360/135 |
| 62-231428 | 10/1987 | Japan | 360/135 |
| 1263930 | 10/1989 | Japan | 360/135 |

*Primary Examiner*—David Davis
*Attorney, Agent, or Firm*—Roy W. Truelson; Mathew J. Bussan; Karuna Ojanen

[57] ABSTRACT

A magnetic recording disk of a disk drive apparatus is constructed having a radially sloped surface, so that the outer area of the disk is thinner than the inner area. The radially downward slope of the disk surface has the effect of increasing the crown of the disk head, this effect being greatest closest to the disk axis and decreasing as the head moves toward the outer diameter. A head landing zone is preferably located at the inner part of the disk surface, where the crown is greatest, reducing stiction during disk start-up. Furthermore, the gradual reduction in crown as the head moves radially outward compensates for the increasing velocity of the head relative to the disk surface, achieving a more uniform flying height of the disk head.

2 Claims, 11 Drawing Sheets

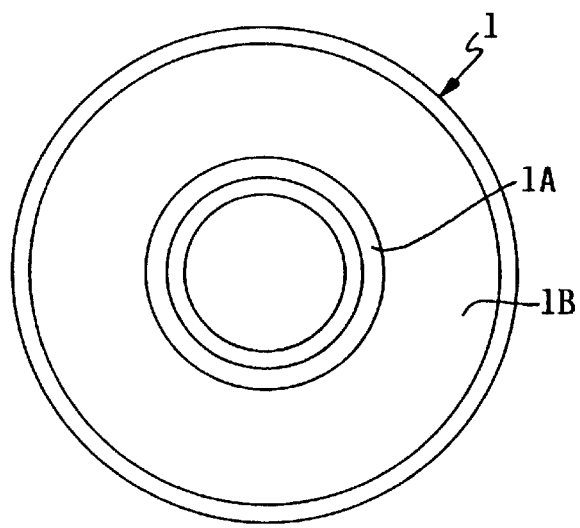
FIG. IA
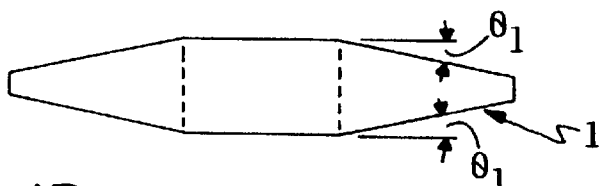
FIG. IB
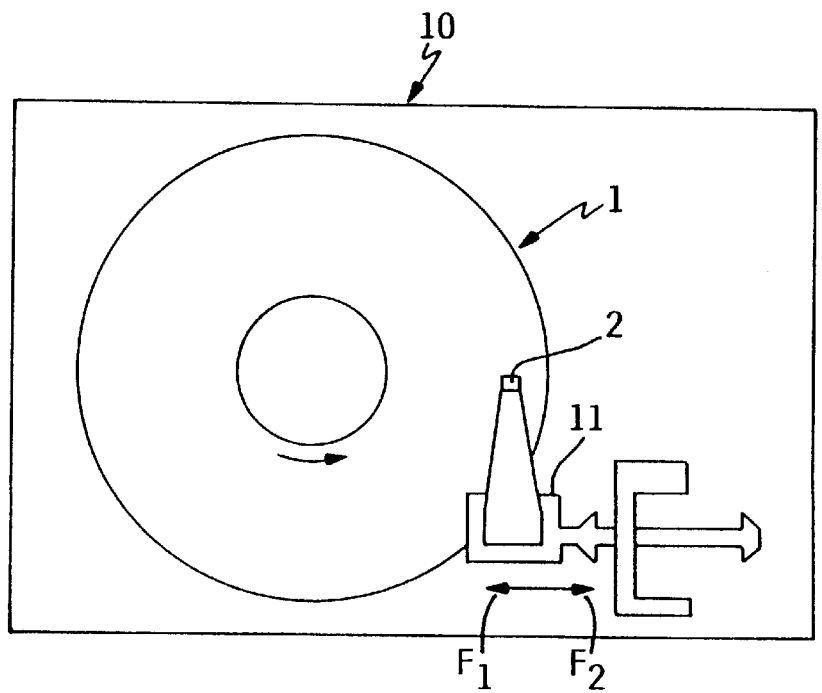
FIG. 2

MAGNETIC DISK AND MAGNETIC DISK APPARATUS HAVING AN ANNULAR START-STOP AREA WITH A RADIAL DOWNSLOPE

This application is continuation of Ser. No. 08/084,674, filed Jun. 29, 1993, now abandoned.

FIELD OF THE INVENTION

The present invention relates to a magnetic disk and a magnetic disk apparatus such as a hard disk apparatus or the like using the magnetic disk.

BACKGROUND OF THE INVENTION

In a conventional magnetic disk apparatus, a disk has a flat surface and the head has a curved crown-shaped surface in order to prevent deterioration from being caused thereon due to contact between a head positioned in a start-stop area on the disk surface and the disk surface when the magnetic disk apparatus starts to drive. In this case, it has been experimentally found that it is more effective to shape the surface of the head into a crown of the unevenness of 20 nm or more.

However, since the hardness of the head is so high, it is very difficult to form such a crown-shaped surface with high accuracy whose unevenness is about 20 nm on the head surface.

SUMMARY OF THE INVENTION

An object of the present invention is to provide a magnetic disk and a magnetic disk apparatus using the magnetic disk which have an advantage of simplicity of manufacture and can prevent deterioration from being caused thereon due to contact with a head when the magnetic disk apparatus drives.

Another object of the present invention is to provide a magnetic disk and a magnetic disk apparatus using the magnetic disk in which the flying height of a head can be held constant over all the surface of the disk against a tendency that the more the head is positioned in an outer area on the disk surface, the more the tangential velocity increases on the disk surface and accordingly the head can easily take off from the disk surface.

A magnetic disk according to the present invention, has a start-stop area thereon for a head, the magnetic disk being characterized in that at least said start-stop area has a radial downslope from inner area to outer area.

Further, the magnetic disk apparatus according to the present invention is characterized in that it has above the magnetic disk a head for reading or writing data from or to the magnetic disk and an actuator for driving the head.

According to the present invention, at least a start-stop area for a head is given a radial downslope from inner area to outer area on the surface of a magnetic disk to form the head positioned to the start-stop area into a virtual crown shape so that when the magnetic disk starts to rotate, the head can rapidly take off from the start-stop area in order to prevent deterioration from being caused on the disk surface due to contact between the disk and the head from occurring.

Further, according to the present invention, as the head moves from inner area to outer area in the radial direction, the virtual crown on the head becomes smaller accordingly, so that the flying height of the head can be held constant over all the surface of the disk against a tendency that the more the head is positioned in an outer area on the disk surface, the more the tangential velocity increases on the disk space and accordingly the head can easily take off from the disk surface.

BRIEF DESCRIPTION OF THE DRAWINGS

FIG. 1(a) and FIG. 1(b) are a top view and a side view, respectively, of a magnetic disk showing an embodiment of the present invention.

FIG. 2 is a schematic top view showing a linear actuator type of hard disk apparatus into which the magnetic disk of FIG. 1 is built.

DETAILED DESCRIPTION OF THE PREFERRED EMBODIMENT

In the following, embodiments according to the present invention are described by reference to drawings.

FIG. 1 to FIG. 8 are illustrations for a first embodiment of the present invention.

Figure 3:
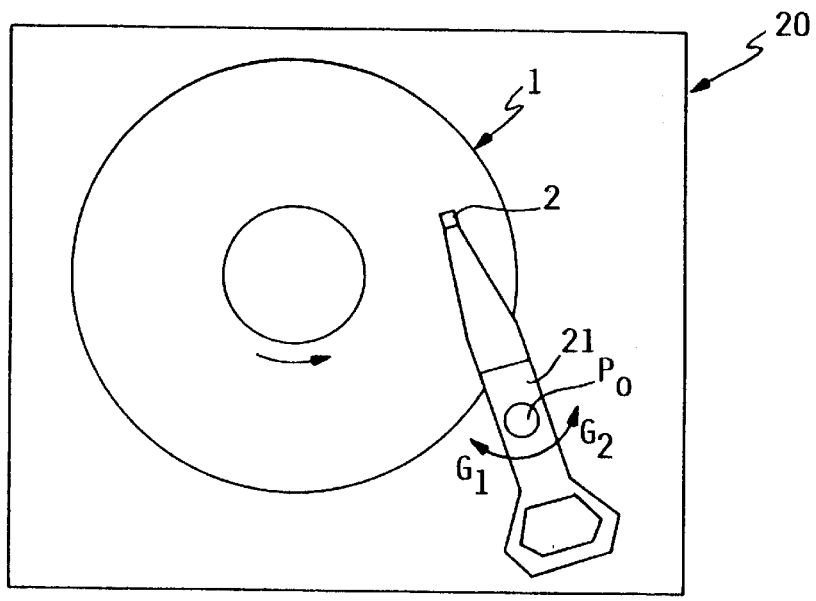
FIG. 3 is a schematic top view showing a rotary actuator type of hard disk apparatus into which the magnetic disk of FIG. 1 is built.
Figure 4:
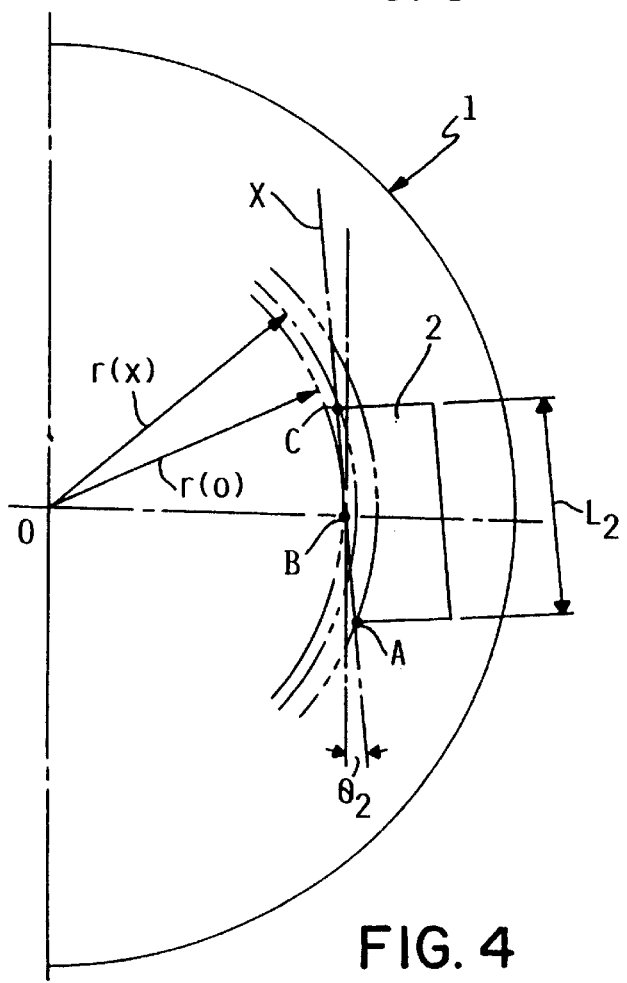
FIG. 4 is a schematic top view showing the positional relationship between the magnetic disk of FIG. 1 and a head given a skew angle.

FIG. 1(a) and FIG. 1(b) are a top view and a side view of a magnetic disk 1, respectively. Referring to FIG. 1, formed in an inner area on a surface of magnetic disk (hereinafter called "disk") 1 is start-stop area 1A for a head and formed in an outer area is data store area 1B. Each surface of disk 1 is given, as described later, a downslope of a predetermined angle of $\theta_1$ from inner area to outer area in the radial direction over all range from start-stop area 1A to data store area 1B so that the thickness of the disk is reduced toward an outer area from an inner area, and thus the disk is formed into a truncated cone. Such a disk is integrated, for use, into, for example, hard disk apparatus 10 (magnetic disk apparatus) of a linear actuator type as shown in FIG. 2 or hard disk apparatus 20 (magnetic disk apparatus) of a rotary actuator type as shown in FIG. 3. The former hard disk apparatus 10 has a construction in which in order to move a head 2 for reading or writing data from or to disk 1 in the radial direction of disk 1, carriage 11 with head 2 mounted thereon is driven and controlled by an unillustrated linear actuator, in the linear direction of arrows $F_1$ and $F_2$. On the other hand, the latter hard disk apparatus 20 has a construction in which in order to rotate head 2 about a point $P_0$ shown in FIG. 3, carriage 21 with head 2 mounted thereon is driven and controlled by an unillustrated rotary actuator, in the rotational directions of arrows $G_1$ and $G_2$. For hard disk apparatus 10, as shown in FIG. 4, head 2 moves in a state that a skew angle of $\theta_2$; that is, an angle made by an X-axis in the longitudinal direction of head 2 having a flat surface (the origin of the X-axis is a center point B in the longitudinal direction of the head 2) and the tangent of a circumference at the center point B in the longitudinal point is held constant. On the other hand, for hard disk apparatus 20, a skew angle of $\theta_2$ changes according to the rotational position of head 2.

Figure 5:
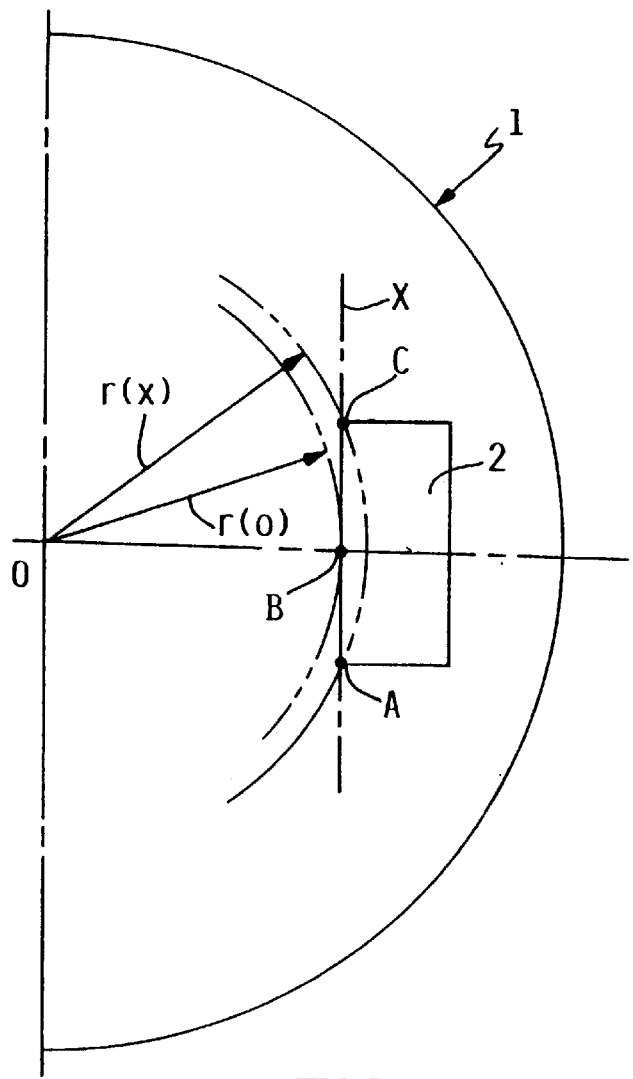
FIG. 5 is a schematic top view showing the positional relationship between the magnetic disk of FIG. 1 and the head given a skew angle of 0°.

Now if the top view of head 2 is a rectangle as shown in FIG. 5, the center point B and the end points A and C correspond to different positions in the radial directions of disk 1. For example, the skew angle $\theta_2$ is "0", as shown in FIG. 5, radius $r(x)$ at any position x of the X-axis in the longitudinal direction of head 2 having a flat surface can be written as follows:

$$r(x) = \sqrt{r(0)^2 + x^2} \quad (1)$$

where $r(0)$ is radius at the center point B (that is, x=0) of head 2. Now, in the case where head 2 moves in the radial direction of disk 1, to see how a difference $(r(\alpha)-r(0))$ between a value of radius $r(0)$ at the center point B of head 2 and a value of radius $r(\alpha)$ at a fixed point $x=\alpha$ (for example, the end point A or C) of the X-axis changes, the difference can be differentiated with respect to $r(0)$ as follows:

$$\frac{d\{r(\alpha) - r(0)\}}{d\{r(0)\}} = -\frac{\sqrt{r(0)^2 + \alpha^2} - r(0)}{\sqrt{r(0)^2 + \alpha^2}} < 0 \quad (2)$$

As is obvious from the above expression (2), $r(\alpha)-r(0)$ is a decreasing function with respect to $r(0)$. In other words, the larger $r(0)$ becomes; that is, head 2 moves outward in the radial direction, the smaller $r(\alpha)-r(0)$ becomes.

As shown in FIG. 4, if a skew angle of $\theta_2$ appears, $r(x)$ can be written as follows:

$$r(x) = \sqrt{r(0)^2 + x^2 - 2r(0) \times \cos(\theta_2 + 90°)} \quad (3)$$

Figure 6:
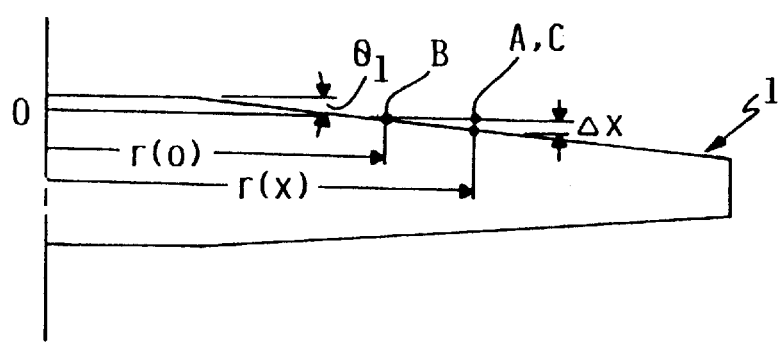
FIG. 6 is a schematic side view showing the positional relationship between the magnetic disk of FIG. 1 and the head.

As described above, if the disk surface is given a predetermined downslope of $\theta_1$ head 2 having a flat surface keeps different distances (spacings), as shown in FIG. 6, between the surface of disk 1 and the center point B or the end point A or C of head 2 on the circumferences of different radius $r(x)$. In FIG. 6, for convenience, the end points A and B are projected to the 0B axis of disk 1. Spacing $\Delta x$ at any point x of the X-axis on head 2 can be expressed as follows:

$$\Delta(x) = (r(x) - r(0))\sin\theta_1 \quad (4)$$

For easy understanding, the skew angle $\theta_2$ is assumed to be "0". As described above, since $r(x)-r(0)$ becomes smaller as head 2 moves outward in the radial direction of disk 1, spacing $\Delta x$ becomes smaller accordingly.

Figure 7:
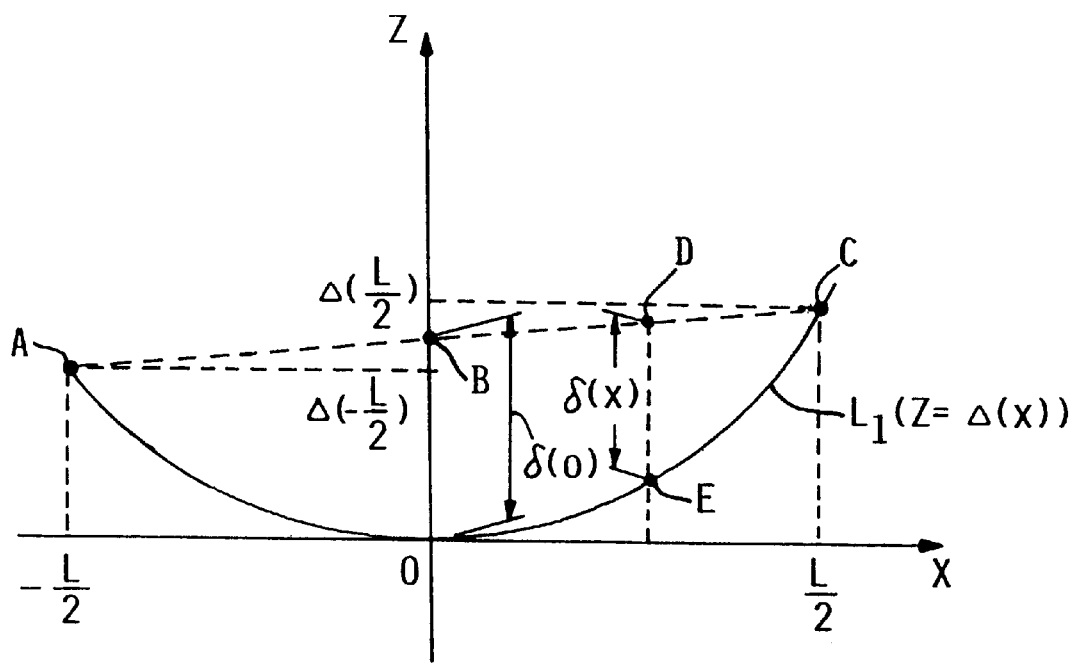
FIG. 7 is a diagram showing a virtual crown for the head caused by the magnetic disk of FIG. 1.

Spacing $\Delta(x)$ between the surface of the disk 1 and each point of the X-axis on head 2 having a flat surface is shown by FIG. 7. In the figure, the horizontal axis is the X-axis of head 2, and the center point B of head 2 is the origin (x=0) and The abscissa of point A: $x = -\frac{L}{2}$ and The abscissa of point B: $x = +\frac{L}{2}$ To locate spacing $\Delta(x)$ in space, the vertical Z-axis is used in the figure and spacing $Z=\Delta(x)$ at any point x of the X-axis of head 2 is shown as a curve $L_1$. In FIG. 7, the straight line connecting points A and C to each other is represented by the following expression (5).

$$Z = \frac{\Delta\left(\frac{L}{2}\right) - \Delta\left(-\frac{L}{2}\right)}{L}\left(x + \frac{L}{2}\right) + \Delta\left(-\frac{L}{2}\right) \quad (5)$$

where

The Z ordinate of point A: $\Delta\left(-\frac{L}{2}\right)$ and

The Z ordinate of point C: $\Delta\left(\frac{L}{2}\right)$

A gradient of the straight line connecting the points A and C is caused by a skew angle of $\theta_2$.

Incidentally, in FIG. 7, for example, the distance between positions D and E; that is, distance $\delta(x)$ along the Z-axis between the straight line connecting the points A and C and the curve $L_1$ indicates a virtual crown for head 2. This means that in the first embodiment, although a crown is not formed on the surface of head 2, spacing $\Delta(x)$ appears, as shown in FIG. 7, as if a curved crown is formed in the longitudinal direction (in the direction of the X-axis) on the surface of head 2. However, a virtual crown $\delta(x)$ and a crown formed on the surface of head 2 differ from each other in that the former changes according to a position to which head 2 moves in the radial direction of disk 1, as described later, and the latter remains unchanged regardless of any position to which head 2 moves.

That is, a virtual crown $\delta(x)$ can be obtained from the following expression (6), based on the expression (5) representing the straight line connecting the points A and C and an expression representing the curve $L_1$ between the points A and C.

$$\delta(x) = \left\{ \frac{\Delta\left(\frac{L}{2}\right) - \Delta\left(-\frac{L}{2}\right)}{L}\left(x + \frac{L}{2}\right) + \Delta\left(-\frac{L}{2}\right) \right\} - \Delta(x) \quad (6)$$

In the above expression (6), the first term on the right-hand side indicates the Z ordinate of a point (for example, point D) in the straight line connecting points A and C, and the second term Δ(x) on the right-hand side indicates the Z ordinate of a point (for example, point E) in the curve $L_1$.

A virtual crown δ(0) at the center point B of the head can be obtained by substituting x=0 and Δ(x)=0 into the expression (6) as follows:

$$\delta(0) = \frac{\Delta\left(\frac{L}{2}\right) + \Delta\left(-\frac{L}{2}\right)}{2} \quad (7)$$

In the above expression (7), $$\Delta\left(\frac{L}{2}\right) \text{ and } \Delta\left(-\frac{L}{2}\right)$$

indicate virtual crowns at the points C and A, respectively.

By substituting them into the expression (4) described above, the following expressions (8) and (9) can be obtained.

$$\Delta\left(\frac{L}{2}\right) = \left\{ r\left(\frac{L}{2}\right) - r(0) \right\} \sin\theta_1 \quad (8)$$

$$\Delta\left(-\frac{L}{2}\right) = \left\{ r\left(-\frac{L}{2}\right) - r(0) \right\} \sin\theta_1 \quad (9)$$

By substituting the expressions (8) and (9) into the expression (7) described above, the following expression (10) can be obtained.

$$\delta(0) = \left\{ \frac{r\left(\frac{L}{2}\right) + r\left(-\frac{L}{2}\right)}{2} - r(0) \right\} \sin\theta_1 \quad (10)$$

$$= \frac{1}{2}\left[ \left\{ r\left(\frac{L}{2}\right) - r(0) \right\} + \left\{ r\left(-\frac{L}{2}\right) - r(0) \right\} \right] \sin\theta_1$$

In the above expression,
Since $$\left\{ r\left(\frac{L}{2}\right) - r(0) \right\} \text{ and } \left\{ r\left(-\frac{L}{2}\right) - r(0) \right\}$$

are decreasing functions with respect to r(0), δ(0) becomes a decreasing function with respect to r(0) if $\theta_1>0$. In other words, the more r(0) becomes large; that is, head 2 moves outward in the radial direction of disk 1, a virtual crown becomes small.

As described above, since the surface of disk 1 according to the first embodiment has a downslope of a predetermined angle $\theta_1$, a virtual crown appears on head 2 having a flat surface and as head 2 moves outward in the radial direction of disk 1, the virtual crown becomes small, accordingly.

Figure 8:
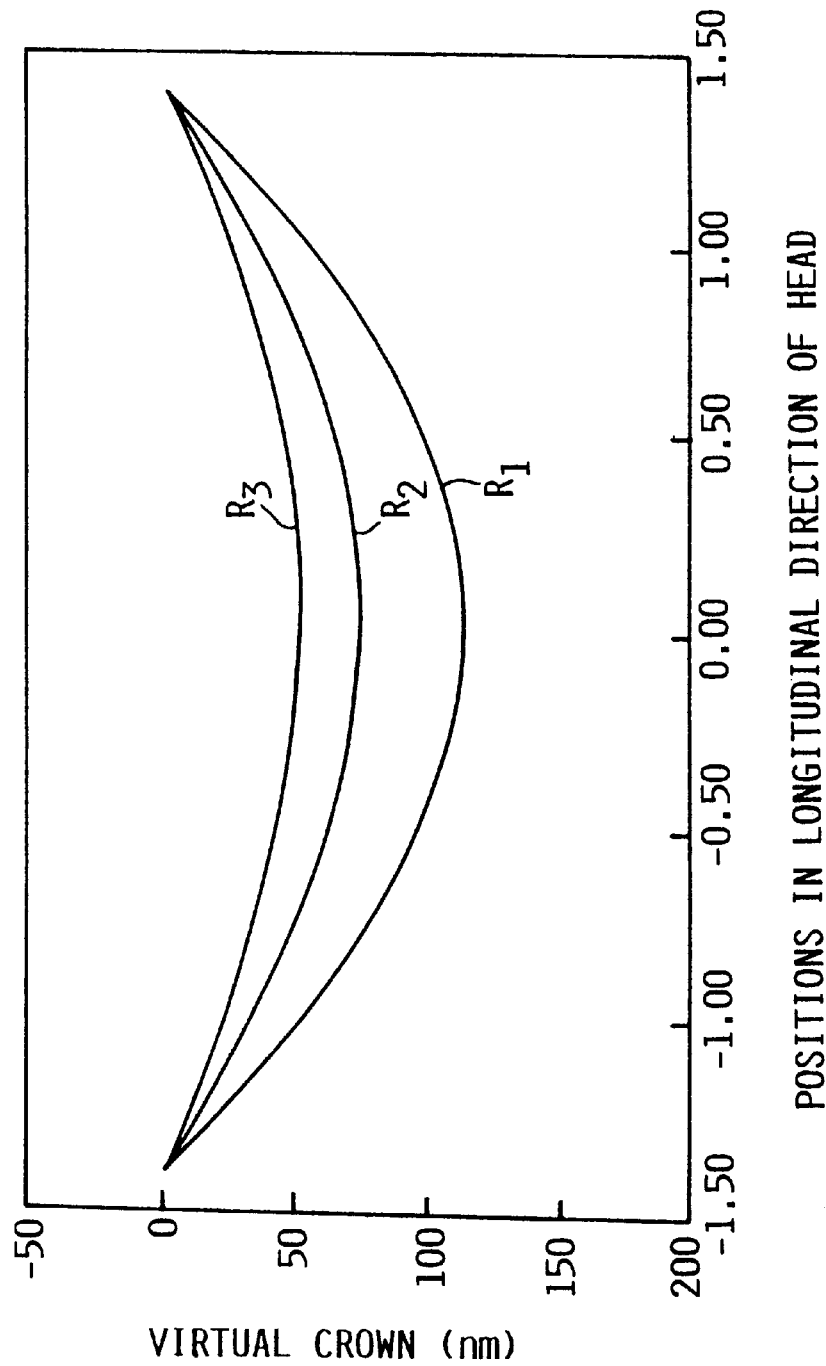
FIG. 8 is a graph showing the relationship between a virtual crown for the head caused by the magnetic disk of FIG. 1 and a position of the head moved.

FIG. 8 shows the results of calculating virtual crowns.

In the calculation, it is assumed that an angle $\theta_1$ of a downslope on disk 1 is 0.1° and the length $L_2$ of the head 2 (see FIG. 4) is 2.8 mm, and hard disk apparatus 20 of FIG. 3 is used and skew angles $\theta_2$ (see FIG. 4) are 2.0°, 10.0° and 17.5° if head 2 moves to a position at each of distances 15.0 mm, 22.5 mm, and 30.0 mm from the origin in the radial direction of disk 1, respectively. Curves $R_1$, $R_2$, and $R_3$ in FIG. 8 show the results of calculating virtual crowns at the distances 15.0 mm, 22.5 mm, and 30.0 mm from the origin in the radial direction of disk 1, respectively. As is obvious from FIG. 8, as the head 2 moves outward in the radial direction of disk 1, the virtual crown becomes smaller, accordingly. Further, as is obvious from FIG. 8, a virtual crown of about 110 nm is given to head 2 in a position at a distance 15.0 mm from the origin in the radial direction of disk 1, and if the both surfaces of disk 1 have the same downslope, the difference between the thickness of disk 1 in a position at a distance 15.0 mm and that of disk 1 in a position at a distance 30.0 mm in the radial direction of disk 1 is 0.05 mm and, if the thickness of disk 1 at its inner area is assumed to he 0.89 mm, then that of disk 1 at its outer area is 0.84 mm.

Incidentally, in the case where the head is positioned at an outer area of the disk, the tangential velocity becomes larger on the surface of the disk than when it is positioned at an inner area of the disk. Therefore, if a conventional disk whose surface has no downslope is used, the flying height in an outer area is larger than the flying height in an inner area due to the difference in tangential velocity between the inner and outer areas of the disk. Such a tendency will not disappear even if the surface of the head is shaped into a crown. This is because even if the head surface is shaped into a crown, flying heights equally increases in the inner and outer areas on the disk and the difference in flying height caused due to the difference between tangential velocities in the inner and outer areas of the disk remains unchanged. However, it is preferable that such a flying height be held constant in respect of magnetic recording, regardless of any position to which the head moves. The present invention makes use of the decrease in virtual crown as head 2 moves outward in the radial direction of disk 1, as shown in FIG. 8, to hold the flying height constant. Since the more a virtual crown is small, the more a flying height becomes small, if disk 1 according to the present invention is used, a difference in flying height caused due to a difference in circumferential speed between the inner and outer areas on disk 1 can be cancelled and flying height can be held constant even if head 2 moves to any position. Therefore, an angle of a downslope on disk 1 according to the present invention can be determined based on a difference in tangential velocity between the inner and outer areas. In examples of FIG. 9 and FIG. 10, the angle of the downslope is 0.2°.

Figure 9:
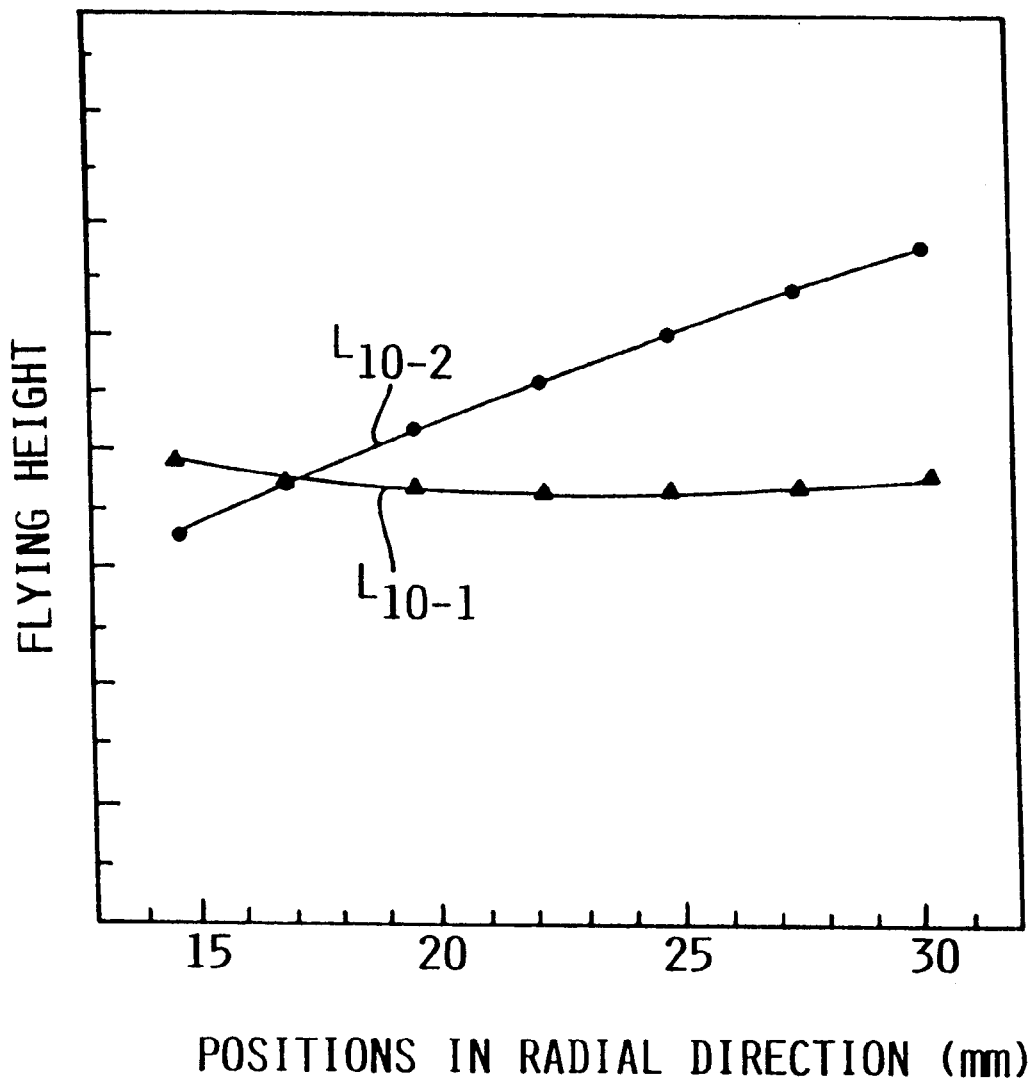
FIG. 9 is a graph showing flying heights for the head, comparing a case where the magnetic disk according to the present invention was built into the hard disk apparatus of FIG. 2 with a case where a conventional magnetic disk was built into the same hard disk apparatus.
Figure 10:
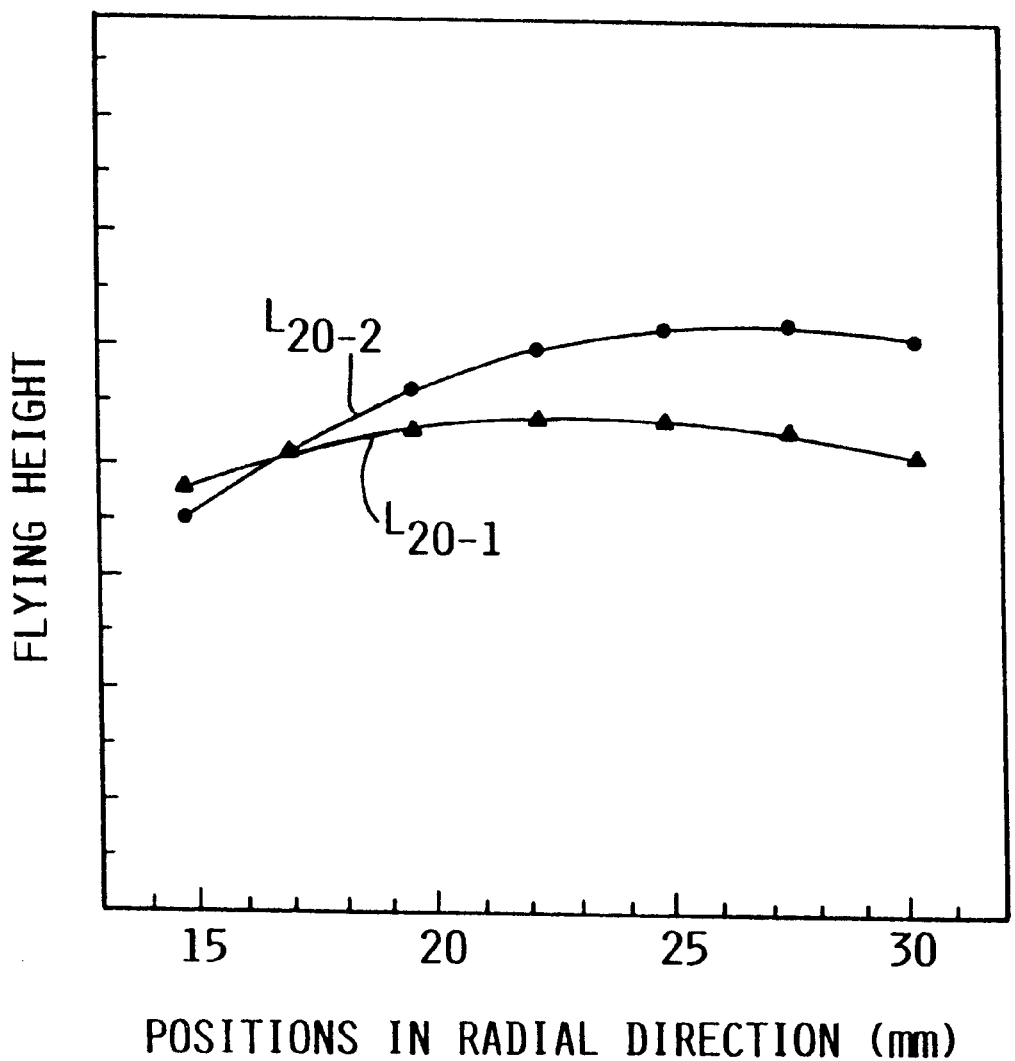
FIG. 10 is a graph showing flying heights for the head, comparing a case where the magnetic disk according to the present invention was built into the hard disk apparatus of FIG. 3 with a case where a conventional magnetic disk was built into the same hard disk apparatus.
Figure 11A:
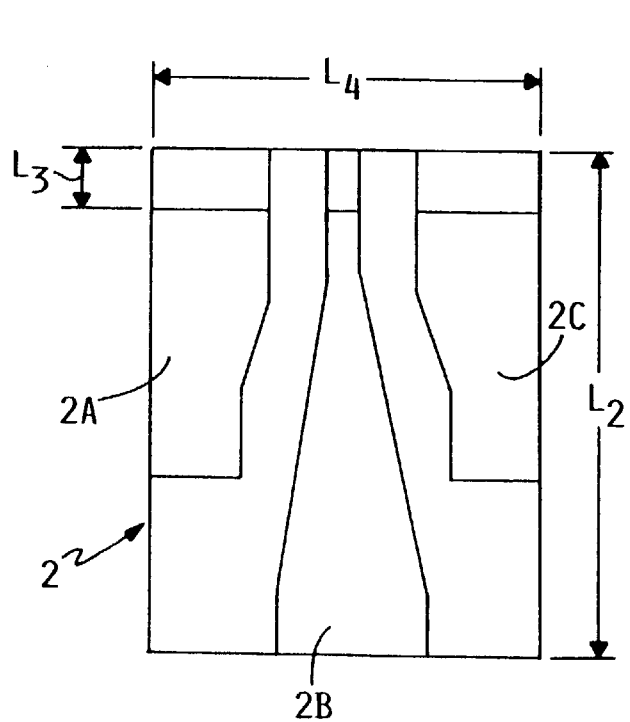
FIG. 11(a) and FIG. 11(b) are a top view and a side view showing the head used for the experiments shown in FIG. 9 and FIG. 10.
Figure 11B:
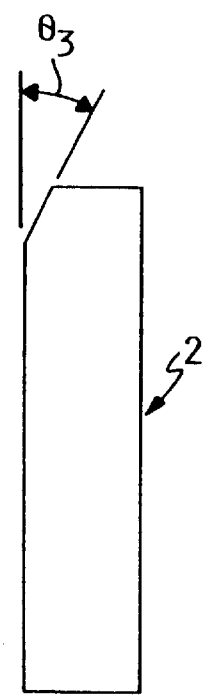

FIG. 9 shows the change of flying height (curves $L_{10-1}$ and $L_{10-2}$) in a case where hard disk apparatus 10 of FIG. 2 includes disk 1, according to the present invention, having a downslope of angle $\theta_1$ and head 2 having a flat surface, and in a case where hard disk apparatus 10 includes a conventional disk having a flat surface and head 2 having a flat surface, respectively. FIG. 10 shows the change of flying height (curves $L_{20-1}$ and $L_{20-2}$) in a case where head disk apparatus 20 of FIG. 3 includes disk 1 according to the present invention and head 2 having a flat surface, and in a case where hard disk apparatus 20 includes a conventional disk having a flat surface and head 2 having a flat surface, respectively. As is obvious from FIG. 9 and FIG. 10, disk 1 according to the present invention causes flying heights for head 2 to be approximately constant regardless of any position in the radial direction of disk 1. In both hard disk apparatus 10 and 20 used, disk 1 drives and rotates at 3600 rpm under 1 normal atmosphere at 25° C., and used as head 2 is a microslider of three-rail type having three rail sections 2A, 2B, and 2C whose surfaces are flat as shown in FIG. 11(a) and FIG. 11(b). In FIG. 11(a), $L_2$, $L_3$ and $L_4$ are 2.53 mm, 0.39 mm, and 1.60 mm, respectively, and in FIG. 11(b), $\theta_3$ is 10 mrad.

Figure 12A:
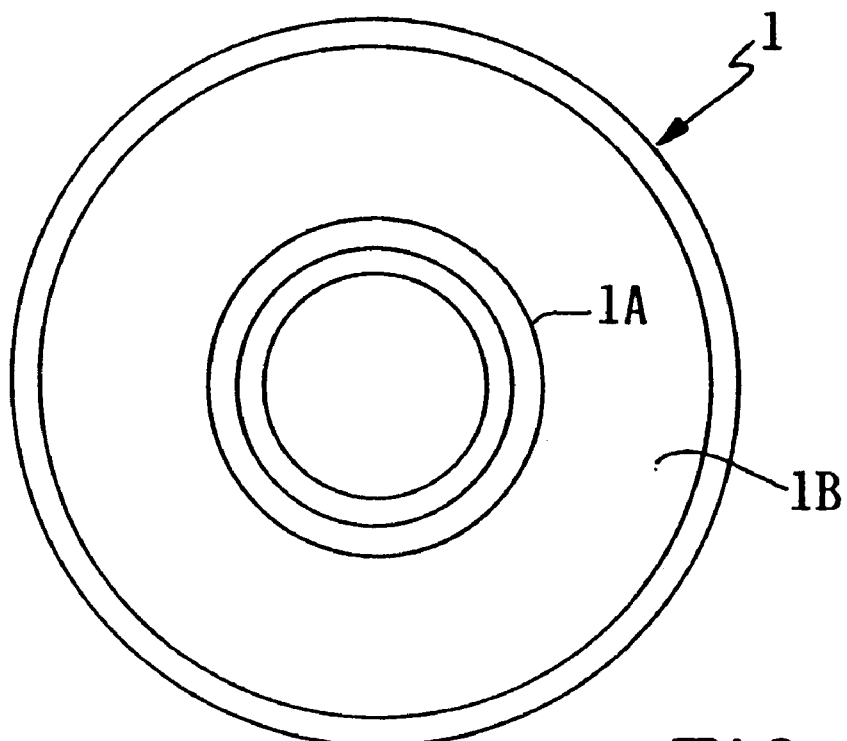
FIG. 12(a) and FIG. 12(b) are a top view and a side view showing a second embodiment of the present invention.
Figure 12B:
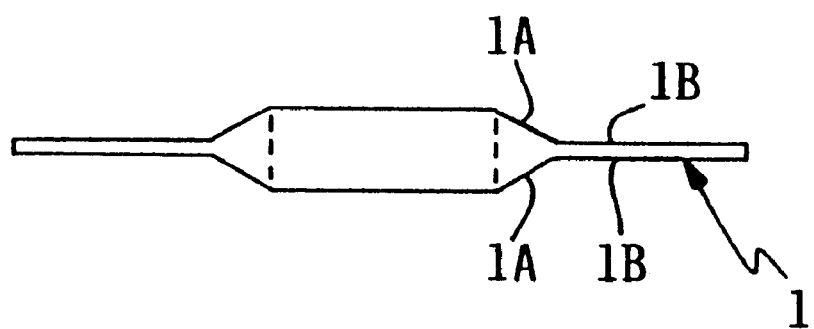
Figure 13A:
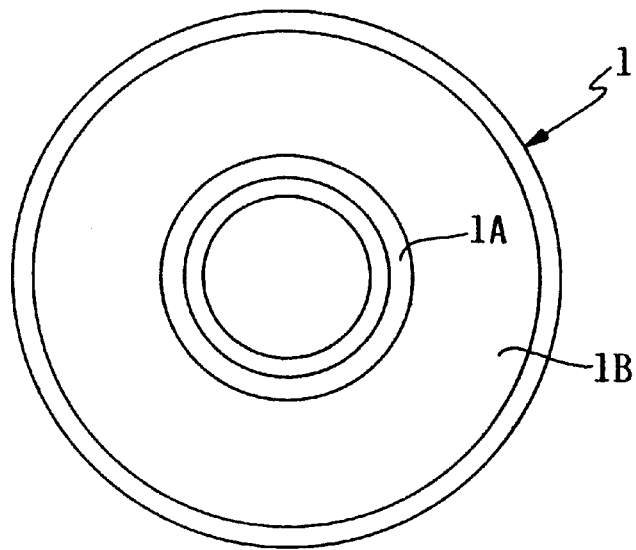
FIG. 13(a) and FIG. 13(b) are a top view and a side view showing a third embodiment of the present invention.
Figure 13B:
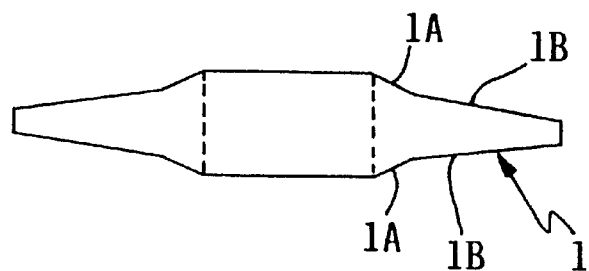

Incidentally, if start-stop area 1A (see FIG. 1) for head 2 is formed in the inner area of disk 1, as shown in FIG. 12, only start-stop area 1A may have a downslope of an angle of $\theta_1$, or as shown in FIG. 13, start-stop area 1A and data store area 1B each may have downslopes of different angles from each other. In the case of FIG. 12, a virtual crown appears on head 2 positioned in start-stop area 1A, which causes head 2 to quickly take off from start-stop area 1A when disk 1 starts to rotate (starts up), to prevent deterioration from being caused on the disk surface due to contact of the head with the disk surface. In the case of FIG. 13, the angle of downslope in start-stop area 1A of disk 1 is set larger than that of downslope in data store area 1B, which causes head 2 to quickly take off from area 1A when disk 1 starts to rotate and causes a virtual crown for head 2 also in area 1B. If it is assumed that area 1A is formed outside of area 1B; that is, in the outer area of disk 1, at least only area 1A shown in FIG. 12 may have a downslope of a predetermined angle.

For a usual disk, start-stop area 1A for a head is formed inside of the data store area, that is, in the inner area of the disk for the reason that starting torque for rotating the disk against static friction between head 2 and start-stop area 1A in contact may be small, and in the case where start-stop area 1A in which no data is stored and the data store area are formed in the inner and outer areas on the disk surface, respectively, a larger storage capacity can be obtained than when the areas are formed in reverse if data has the same recording length.

Figure 14:
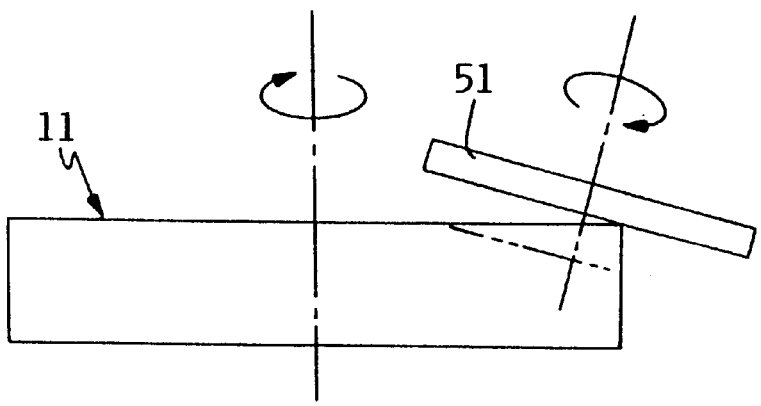
FIG. 14 is a schematic side view showing a method for processing a magnetic disk according to the present invention.
Figure 15:
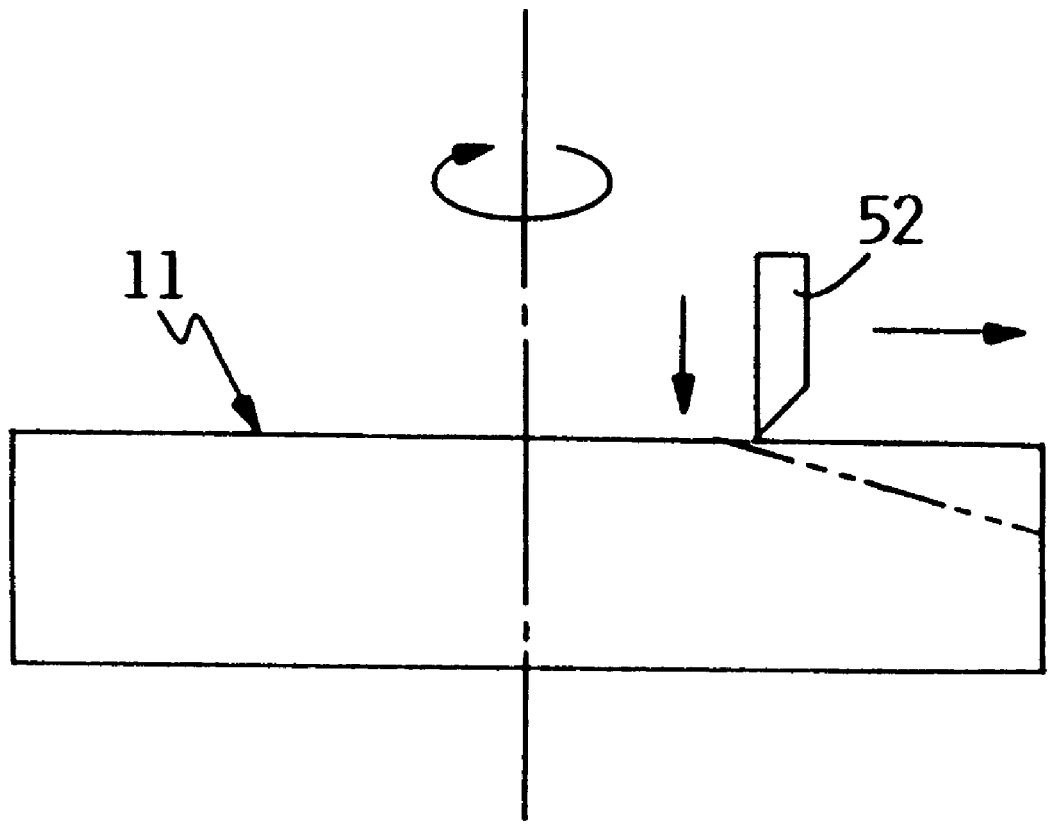
FIG. 15 is a schematic side view showing another method for processing the magnetic disk according to the present invention.

FIG. 14 and FIG. 15 shows different examples of processing a surface of disk 1 so as to have a downslope.

In FIG. 14, disk material 11 and rotary grindstone 51 rotate about their respective axes and rotary grindstone 51 pushes the surface of disk material 11 to grind the disk surface so that it has a downslope. On the other hand, in FIG. 15, disk material 11 rotates about its axis and abrasive cutter 52 cuts the disk material while it moves from an inner area to an outer area in the radial direction of the disk material 11 so that the disk surface may have a downslope. Both methods have the advantage of simplicity in processing because disk material 11 of lower hardness than head 2 is used, in comparison with a conventional method which processes head 2 to form a crown-shaped surface. Moreover, the method shown in FIG. 15 is a preferred method for processing the above-mentioned disks 1 of FIG. 12 and FIG. 13.

In the above-mentioned disk 1 according to the present invention, its size, the positions and ranges of areas 1A and 1B to be formed, or the angle $\theta_1$ of downslope, etc., are examples, and the present invention is not limited to the above embodiment. Further, it will be appreciated that disk 1 according to the present invention can compose a magnetic disk apparatus in combination with various kinds of heads and a drive apparatus. For example, a head having a flat surface or a head having a crown-shaped surface may be used with or without a given skew angle, respectively, or such a magnetic disk apparatus as shown in FIG. 2 and FIG. 3 may be used and a skew angle may be or not changed according to a position of the moving head.

As described above, according to the present invention, since such a construction that at least a start-stop area for a head has a downslope from inner area to outer area on a surface of a magnetic disk in the radial direction of the disk is provided, a virtual crown can be given to the head positioned in the start-stop area, which allows the head to quickly float over the start-stop area to prevent deterioration from being caused on the disk surface due to contact with the head.

Further, according to the present invention, since as the head moves outward in the radial direction of the magnetic disk, a virtual crown on the head becomes small accordingly, the flying height of the head can be held constant over all the surface of the disk against a tendency that the more the head is positioned in the outer area of the disk, the tangential velocity increases on the disk surface and accordingly the head can easily take off from the disk surface.

Still further, it is generally well known that static friction to be applied to initiate the rotation of a magnetic disk decreases as a crown for a head becomes larger, and therefore if the magnetic disk according to the present invention is used, a magnetic disk apparatus can be constructed simply which can use a low-torque motor as a motor for driving and rotating the magnetic disk.

What is claimed is:

1. A magnetic disk for use within a rotating magnetic disk drive device, said magnetic disk having a surface for recording data, wherein:

a first annular portion of said disk surface is a start-stop area for resting a transducer head when said magnetic disk drive is not in use;

a second annular portion of said disk surface is a data storage area for recording data;

said annular start-stop area has a radial downslope from an inner part of said annular start-stop area to an outer part of said start-stop area such that the thickness of said magnetic disk decreases from said inner part of said annular start-stop area to said outer part of said annular start-stop area, and wherein said inner part of said annular start-stop area corresponds to an inner area of said disk; and said second annular portion has no radial downslope.

2. A magnetic disk drive apparatus, comprising:

at least one rotatable magnetic disk having a surface for recording data;

a transducer head for accessing data recorded on said disk surface;

an actuator for positioning said transducer head;

a first annular portion of said disk surface is a start-stop area for resting said transducer head when said magnetic disk drive is not in use;

a second annular portion of said disk surface is a data storage area for recording data;

said annular start-stop area has a radial downslope from an inner part of said annular start-stop area to an outer part of said start-stop area such that the thickness of said magnetic disk decreases from said inner part of said annular start-stop area to said outer part of said annular start-stop area, and wherein said inner part of said annular start-stop area corresponds to an inner area of said disk; and said second annular portion has no downslope.

* * * * *